United States Patent

Marques et al.

[11] Patent Number: 6,130,964
[45] Date of Patent: Oct. 10, 2000

[54] IMAGE SEGMENTATION AND OBJECT TRACKING METHOD AND CORRESPONDING SYSTEM

[75] Inventors: Ferran Marques; Cristina Molina, both of Paris, France

[73] Assignee: U.S. Philips Corporation, New York, N.Y.

[21] Appl. No.: 09/018,984

[22] Filed: Feb. 5, 1998

[30] Foreign Application Priority Data

Feb. 6, 1997 [EP] European Pat. Off. .............. 97400269
Oct. 28, 1997 [EP] European Pat. Off. .............. 97402558

[51] Int. Cl.[7] .................................................. G06K 9/00
[52] U.S. Cl. ............................................ 382/236; 382/243
[58] Field of Search .................................. 382/103, 154,
382/173, 100, 174, 248, 101, 236–243,
107–141; 348/413, 416, 118, 172, 401–412

[56] References Cited

U.S. PATENT DOCUMENTS

| | | | |
|---|---|---|---|
| 4,658,372 | 4/1987 | Witkin | 364/550 |
| 5,278,915 | 1/1994 | Chupeau et al. | 382/1 |
| 5,552,823 | 9/1996 | Kageyama | 348/155 |
| 5,577,134 | 11/1996 | Westerink | 382/240 |
| 5,594,504 | 1/1997 | Ebrahimi | 348/416 |
| 5,717,463 | 2/1998 | Brailean et al. | 348/416 |
| 5,757,382 | 5/1998 | Lee | 345/441 |
| 5,774,591 | 6/1998 | Black et al. | 382/236 |
| 5,832,115 | 11/1998 | Rosenberg | 382/199 |

FOREIGN PATENT DOCUMENTS

0707427A2 4/1996 European Pat. Off. ......... H04N 7/26
0737012A2 10/1996 European Pat. Off. ......... H04N 7/26

OTHER PUBLICATIONS

"Tracking Areas of Interest for Content–Based Functionalities in Segmentation–Based Video Coding" by Ferran Marques et al, Proceedings of the 1996 IEEE International Conference on Acoustics, Speech, and Signal Processing, May 7–10, 1996, Atlanta, Georgia.

"Morphological Segmentation", Journal of Visual Communication and Image Representation, pp. 21–46, Sep. 1990.

"A VLSI Architecture for Hierarchical Motion Estimation", by A. Costa et al., IEEE Transactions on Consumer Electronics, vol. 41, No. 2, May 1995, pp. 248–258.

*Primary Examiner*—Bijan Tadayan
*Assistant Examiner*—Ali Bayat

[57] ABSTRACT

This relates to a method for image segmentation and video object tracking. While conventional methods rely on the motion homogeneity of the objects to be tracked, the present method is based on a concept of partition projection in which both spatial and motion information are now exploited, and implemented by means of a modified double partition approach, including a re-segmentation of a first partition followed by a projection step of the obtained fine partition into the current frame. Objects presenting non-homogeneous motion, static objects, and parts of an object with homogeneous motion can thus be tracked.

10 Claims, 13 Drawing Sheets

IMAGE SEGMENTATION AND OBJECT TRACKING METHOD AND CORRESPONDING SYSTEM

BACKGROUND OF THE INVENTION

The present invention relates to a segmentation and object tracking method applied to an image sequence, said method comprising in series the following steps:

(A) a segmentation step for defining the regions of a first coarse partition P(t−1) of an image I(t−1) and, from said coarse partition P(t−1) and on the basis of a spatial homogeneity criterion, a finer partition FP(t−1)

(B) a projection step for defining a projection PFP(t) of said fine partition FP(t−1) into the current image I(t);

(C) a re-labelling step of said projected fine partition PFP(t), for defining the final partition P(t).

The invention also relates to a corresponding system for carrying out said method.

One of the most known compression techniques for the transmission of image data, the cosine transform coding, does not allow to obtain a compression ratio greater than about 16:1. At low and very low bitrate coding, compression ratios can be improved by incorporating knowledge about the image contents into the coding scheme, thanks to techniques that segment objects from the background of the images, detect the segmented objects and, after having coded these objects as textures regions surrounded by contours, transmit the data related to them. However these contours and textures are not efficiently coded in a three-dimensional space (the discrete nature of the time dimension leads to great discontinuities) and, in order to reach very low bitrates, motion compensation has to be used.

This lack of connectivity between regions related to objects considered at discrete successive times may indeed be solved by including motion information in the segmentation, which is particularly necessary when large motion is present in a video sequence. This is done for example by segmenting a frame or picture F(t) (t being the time) on the basis of the segmentation already obtained for the previous frame or picture F(t−1), by computing a backward motion estimation between both frames, and carrying out a motion compensation of said previous frame F(t−1) and of its segmentation. Such a technique allows to track rather efficiently through the time domain the regions corresponding to the objects selected as areas of interest.

However, in the field of video coding, new coding schemes with embedded content-based functionalities enabling the separate manipulation and definition of the various objects of a scene (whatever the object definition that may rely on very different criteria) are a more and more active research field, especially in relation with the future MPEG-4 standard that targets interactive multimedia applications and will be probably frozen before the end of 1997 or in 1998. Once objects, or groups of objects, have been defined, they have to be tracked through the sequence. It is this tracking capability which really opens the door to content-based functionalities, allowing to relate the information between the objects in the previous frames with the current and future frames, that is, to define a temporal evolution of the objects (in addition to that, this tracking capability allows the user to mark only once the selected object).

Classical object tracking techniques, using motion as main information, may fail in tracking an object composed of several parts presenting different motions (for example, a person walking and whose arms and body move differently).

In addition, motion-based tracking techniques cannot track parts of an object if the complete object follows a given motion (for example, they are not able to track only the face of a person separately from the hair). Finally, if the complete scene is static (the object does not move) or if there is a global motion of the camera (e.g. a panning), motion-based tracking techniques cannot track or may have difficulties in tracking the selected object. A static scene (or a scene that becomes static) does not provide any motion information and thus the detection of objects based on their motion is indeed difficult. Analogously, a global motion of the camera creates an apparent motion for all objects in a scene and, therefore, objects cannot be easily detected based on the separation into static and moving areas.

In order to track such types of objects, some techniques propose to cope with different object definition criteria. An object tracking method relying on the concept of partition projection (a previous image I(t−1) and its partition P(t−1) are motion compensated, I(t−1) leading to Î(t) and P(t−1) to P̂(t), and the compensated regions are used, in the compensated image Î(t), as markers that are extended in the current image by means of the well-known 3D watershed algorithm) but extending the technique to the case of regions with any type of homogeneity is described for example in "Tracking areas of interest for content-based functionalities in segmentation-based video coding", F. Marqués and al., Proceedings of the 1996 IEEE International Conference on Acoustics, Speech, and Signal Processing, May 7–10, 1996, Atlanta, Ga., USA.

Said tracking technique relies on a double partition approach, i.e. it uses two levels of partition: a coarse level partition, which is related to the coding scheme, and a finest level partition, which contains a more detailed rich description of the current image and allows the tracking of the areas of interest. For each image, both segmentations are carried out in parallel and the coarse partition constrains the finest one: all contours in the coarse partition are also present in the finest one, the ultimate goal being to obtain a final partition containing the necessary regions to efficiently code the image, as well as the necessary regions to correctly track said areas of interest.

In the present case, the partition P(t−1) of the previous image (this partition in the first level is formed by the objects that have been selected) is re-segmented, which yields a fine partition FP(t−1) guaranteeing the spatial homogeneity of each fine region. This fine partition FP(t−1) is then projected into the current image to obtain a fine partition at time t (PFP(t)), and the final partition P(t) is obtained by re-labelling said projected fine partition PFP(t).

The corresponding complete procedure is illustrated in FIG. 1, where the evolution of a selected object (partition P(t−1) at time t−1, fine partition FP(t−1) at time t−1, projected fine partition PFP(t) at time t, partition P(t) at time t), is shown. In this example, the re-labelling procedure yields unconnected components with the same label (grey areas in the projected fine partition PFP(t−1)), that are here considered as being projections errors and are therefore removed.

OBJECTS AND SUMMARY OF THE INVENTION

An object of the invention is to propose an improved method allowing as previously to track objects of interest but according to which spatial and motion information are now exploited together to improve some steps of said method.

To this end the invention relates to a method such as described in the preamble of the description and wherein said projection step comprises in series the following substeps:

(1) a marker projection sub-step, using motion and spatial information for yielding a set of markers for the current image by means of a motion compensation of each region of the previous image;

(2) a partition creation sub-step, using spatial information contained in the current image and in the previous original images for a growing process of said set of compensated markers in order to obtain said final partition.

In a preferred implementation, said method is more precisely characterized in that:

(1) said marker projection sub-step comprises itself in series the following operations:

(a) a motion estimation operation between the images I(t−1) and I(t);

(b) based on said estimation, a backwards motion compensation operation of the fine partition FP(t−1), yielding a compensated fine partition CFP(t−1) made of so-called compensated markers;

(c) in said image, a component selection operation, provided for selecting, among the possible unconnected components that correspond to a single label of the coarse partition P(t−1) and have the same label, only the components that, for each of these specific labels, satisfy a first predetermined criterion, the non-selected components defining a so-called uncertainty area that surrounds the compensated markers;

(2) said partition creation sub-step comprises itself in series the following operations:

(e) a marker re-labelling operation, provided for re-labelling, when several markers have been created from a single region of the fine partition FP(t−1), all the markers except one;

(f) a growth operation of all selected markers in the current image I(t) by means of a tridimensional extended watershed algorithm, leading to a projected fine partition PFP(t);

(g) a merging operation of the regions of said projected fine partition PFP(t) that, having the same label in the previous image, are connected after the region growing, for defining the final partition P(t).

Advantageously, the marker projection sub-step may also comprise in series:

(d) a cleaning operation based on the gradient of the compensated markers;

(e) a boundary removal operation; these two operations being applied in order to ensure the gray level homogeneity of the projected markers while preserving their homotopy.

Moreover, during the component selection operation, an unconnected component with a given label k may be selected if it contains at least a given percentage of all pixels with the same label k in the compensated fine partition CFP(t−1).

Another object of the invention is to propose a segmentation system allowing to carry out the previously presented method.

To this end the invention relates to a system for a segmentation and object tracking in images of an image sequence, said system comprising the serial arrangement of a marker projection device and a partition creation device, said marker projection device including in series a motion estimation circuit, a motion compensation circuit and a component selection circuit, and said partition creation device including in series a marker re-labelling circuit, a marker growth circuit and a merging circuit.

Where previous techniques were only using motion, the present method and the corresponding system provided for its implementation now allow to combine motion and spatial information in order to be able to track objects which do not present either homogeneous texture or motion. Motion between consecutive frames is estimated and used to motion compensate the regions of the previous partition. Compensated regions are directly imposed in the current frame in order to increase the temporal stability of the tracking system. The spatial homogeneity of the projected markers in the current image is verified to ensure the correctness of the final marker growing process. Given that the core of the algorithm is based on morphological tools, the complete technique does not imply a high computational load. This object tracking method has been demonstrated to yield good results in very different scenarios and for various applications. The method has been applied to the problem of generation of video objects (called VOs) for content-based functionalities in object-based coding schemes. In addition, the scheme has been used to create a hierarchy of video objects, making easier the access to real content-based scalable coding techniques.

BRIEF DESCRIPTION OF THE DRAWINGS

These and other aspects of the invention will be now explained with reference to the embodiments described hereinafter and considered in connection with the accompanying drawings, in which.

DETAILED DESCRIPTION OF THE EMBODIMENT

Figure 1:
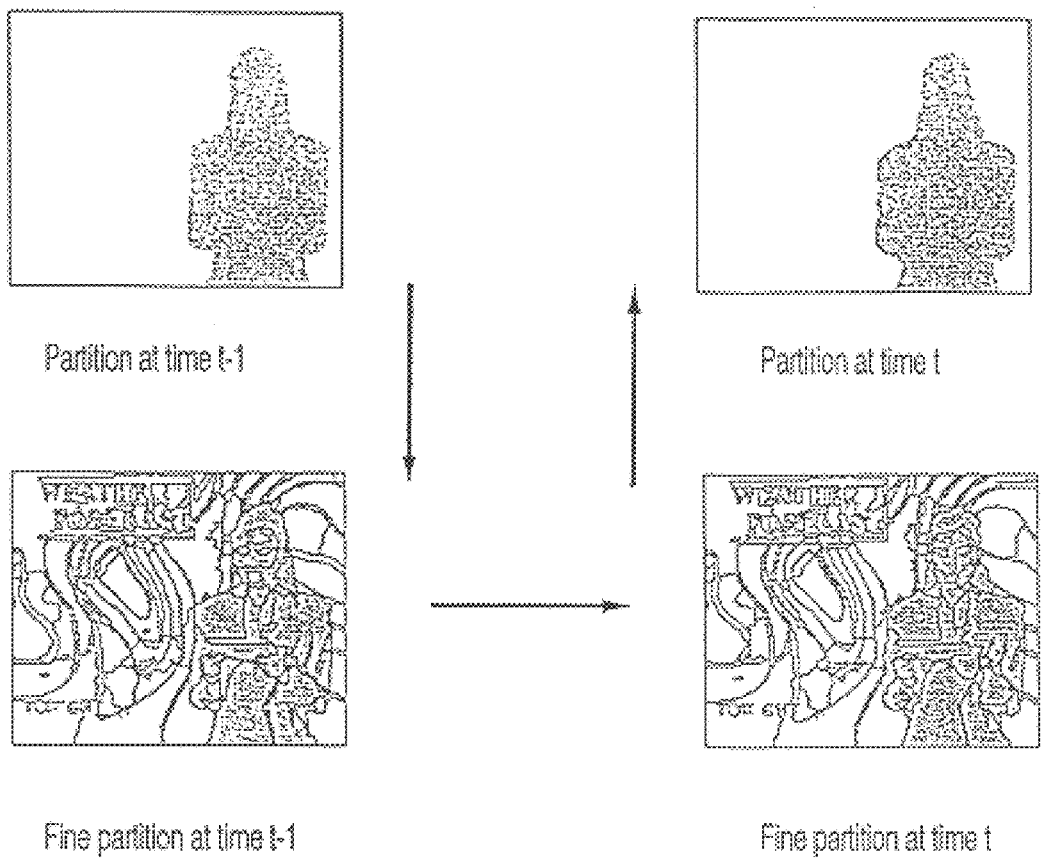
FIG. 1 illustrates the procedure corresponding to the conventional double partition approach.
Figure 4:
FIGS. 4 to 7 illustrate the improvement achieved by the use of a new criterion for keeping or removing unconnected components, with a comparison between this new approach and the previous one.
Figure 2:
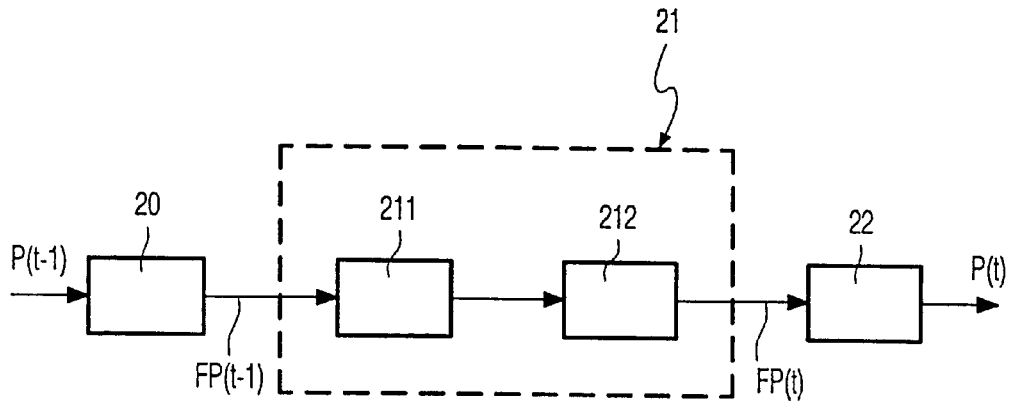
FIG. 2 illustrates within a similar procedure a projection step modified according to the invention.

With respect to the previously recalled main steps of the double partition approach, and as illustrated in FIG. 2, the invention relates, more precisely, to the specific technique used for the projection step, referenced 21, of the fine partition FP(t−1) (said fine partition resulting from a re-segmentation 20 of the partition P(t−1) of the previous image) into the current image, in order to obtain first the projected fine partition PFP(t) and then, after a re-labelling step 22, the partition P(t). This projection step, provided for accommodating the partition P(t−1) of the previous image I(t−1) to the information of the current image I(t), will be improved so that temporal stability is increased. As indicated in FIG. 2, the implementation of this improved projection step can be divided into two sub-steps 211 and 212: a marker projection sub-step and a partition creation sub-step.

The marker projection uses motion information for carrying out a motion compensation of each region from the previous image I(t−1). These regions, associated to homogeneous areas in the previous frame, are motion compensated, and they yield markers showing the approximated position of these regions in the current image I(t). In the partition creation process, this set of compensated markers is then grown so that the final partition P(t) is obtained. The growing process uses the spatial information contained in the current image I(t) as well as in the previous one I(t−1), which has been motion compensated. In the proposed projection step 21 of the method according to the present invention, spatial and motion information are combined in both the marker projection and the partition creation.

Figure 3:
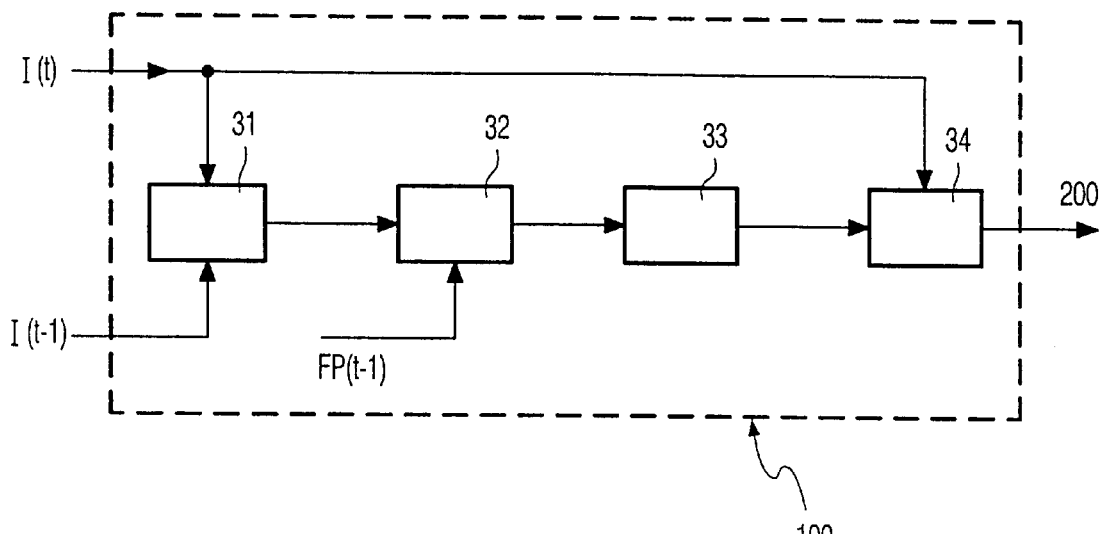
FIG. 3 shows a block diagram of a marker projection device provided for the implementation of the first sub-step of said projection step.

The first sub-step of the projection step, the marker projection, is now described in a more detailed manner, with reference to FIG. 3 that shows an implementation of said sub-step by means of a marker projection device 100. This device comprises in series several circuits that will be successively described.

A motion estimation circuit 31 first allows to obtain a rough estimation of the motion between both images I(t−1) and I(t), for instance by means of a backwards block-matching technique. Such a technique is described for example in "A VLSI architecture for hierarchical motion estimation", IEEE Transactions on Consumer Electronics, vol.41, n° 2, May 1995, pp.248–257: the image I(t) is divided into small blocks of picture elements (for example 8×8 pixels) and for each of them a search is conducted within a given window in the image.

I(t−1) in order to locate in that image a best matching block. The obtained motion information, given in the form of motion vectors respectively estimated for all the blocks of the considered image, is a sufficient approximation even when the motion of some blocks involving more than one object is not strictly uniform.

A motion compensation circuit 32 then allows to use the obtained motion vectors for a motion compensation of each region of the image I(t), in order to obtain as a final result an image containing, for each region coming from the previous image I(t−1), a connected component with the same label as in said previous image. Each of these components has been itself obtained in the following manner: every pixel of the current image I(t) is covered (after the backwards motion estimation) by one, and only one, pixel from the previous image I(t−1).

However, the image resulting from the compensation of the previous partition is not really a partition itself. Unconnected components with the same label may appear after compensation. To solve this problem, a component selection circuit 33 is provided: for each label of the previous partition P(t−1) leading after compensation to more than one component, this circuit allows to keep only the relevant components, according to a predetermined criterion, generally a geometrical one. In practice, a component with label k is removed if it contains less than a given percentage (for example about 40%) of all pixels with label k in the compensated fine partition CFP(t−1). This way, a given label can lead to more than one connected component, if each of them is large enough. The removed components form a so-called uncertainty area that surrounds the obtained compensated markers. Pixels from this uncertainty area will be labelled later, during the partition creation sub-step 212.

Figure 7:
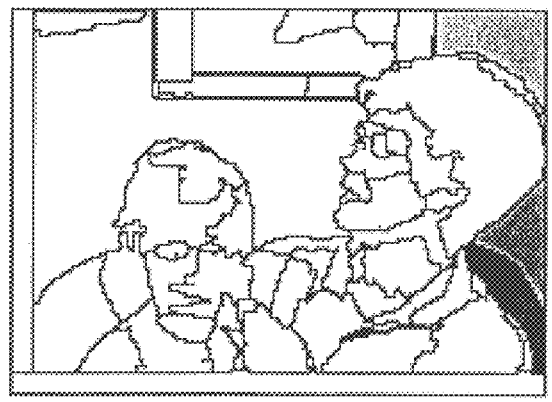

The example in FIGS.4 to 7 illustrates the necessity of keeping more than one connected component if these components are large enough. The first image (FIG 4.) is an example of an original image to be segmented, for instance an image n (with n=50), in a typical sequence of videotelephony (the well known "mother and daughter" test sequence), whereas the second one (FIG. 5) presents the boundaries of the set of projected markers from image n to image (n+5) in the same sequence, The zones between markers belong to the uncertainty area. As can be seen, the movement of the head of the mother splits into two parts the area of the background located behind her head (areas in light and dark grey in the image). If the smallest marker is removed, a marker of a neighbour region grows covering this zone. In the third image (FIG. 6), the zone of the background has been covered by a marker belonging to the sofa (area in black). When using on the contrary the new approach, large unconnected markers are kept, even if they share their label with another marker. In the case of FIG. 7, this results in having specific regions for both parts of the background (said background has been covered by its two related markers, and the black marker only covers its associated area).

Finally, in order to ensure the spatial homogeneity of the compensated markers, a cleaning circuit 34, the output of which will then be the output of the device 100 implementing the marker projection sub-step 211, may be provided. It must indeed be noted that the use of motion information in the projection step 21 makes possible that labels from the partition P(t−1) are not present in P(t). This way, the label of an object disappearing from the scene does not remain in the following image. However, since a rough motion estimation is used, the position of a marker in the current image may not be totally correct with respect to the region it represents. The gray level values covered by a marker from a given region may not have spatial homogeneity. Therefore, the marker may overlap the area that should be assigned to two different regions. Given that markers are directly imposed on the current image, each one of them has to cover an area of the image that actually belongs to its related region.

Figure 8:
FIGS. 8 to 12 illustrate the marker projection and selection between two images of a known test sequence.

The cleaning operation implemented by the circuit 34 relies on the gradient of the gray level information covered by the concerned marker. Usually, the marker is correctly located but it partially covers an area from other regions with different grey level values. Therefore, for each compensated marker, the mean value of the gradient of the pixels that it covers is computed. All pixels above a given threshold over this mean value are assigned to the uncertainty area. This cleaning operation may however remove small parts of markers which were correctly assigned: this effect will be shown in FIGS. 8 to 12 where two different cases are illustrated using another typical test sequence ("foreman" sequence, FIG.8 showing the original image of said sequence). If a region presents small gray level transitions in its interior, they may be removed by the cleaning operation. This is the case of some areas in the building. In addition, if a region has homogeneous but not constant gray level values (e.g. gray level values following a parabolic function), some parts may be removed as well. This is the case of the right cheek of the person. In order to solve these problems, markers are grown to cover their interior holes. A final operation is applied to increase the uncertainty area between regions so that the final boundary location will not be totally driven by the region motion compensation. The uncertainty area is increased by removing the pixels from the boundaries of the markers. This removal is done preventing any change in the homotopy of the markers: markers cannot be split in the process.

Figure 9:
Figure 10:
Figure 11:
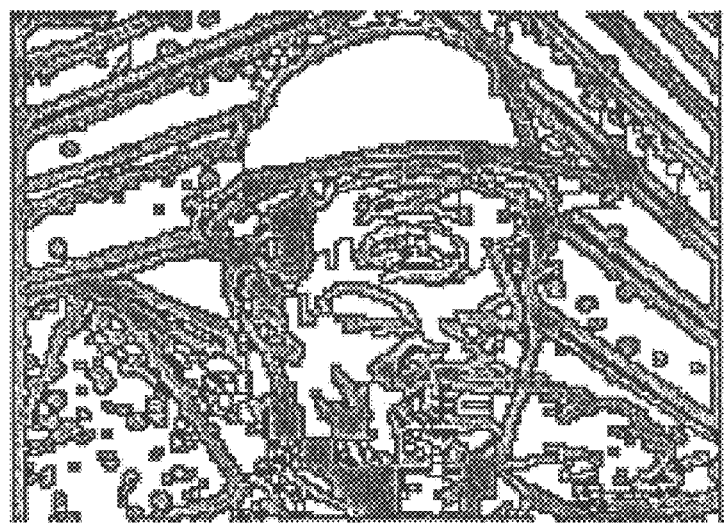
Figure 12:
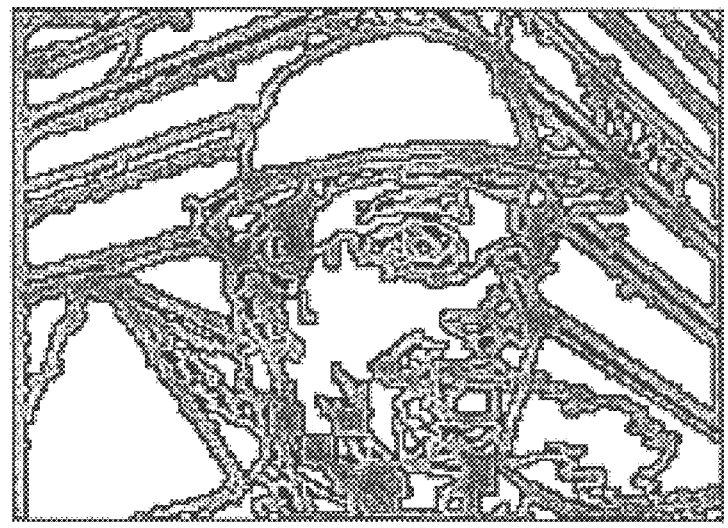

The example in FIG. 9 presents the fine partition of the first image of the sequence where the man has been selected (the second image of FIG. 10 presents the corresponding original image, for n=5, of the "foreman" sequence to be segmented), while FIG. 11 shows the set of projected markers after the gradient-based cleaning operation (some uncertainty areas, in grey, have appeared in homogeneous areas such as the building or the cheek). Finally, the set of selected markers after the growing and boundary removal processes is presented in FIG. 12) (in all images, region boundaries are marked in black). In the whole operation, the homotopy of the projected partition is not changed, that is, no regions are removed or split. Moreover, it must be noted that, after the cleaning operation, all the projected markers (see FIG. 12) correspond to homogeneous regions in the image (FIG. 10). With this improvement, the following sub-step of the projection step 21 is improved since it is based on more reliable information.

Figure 13:
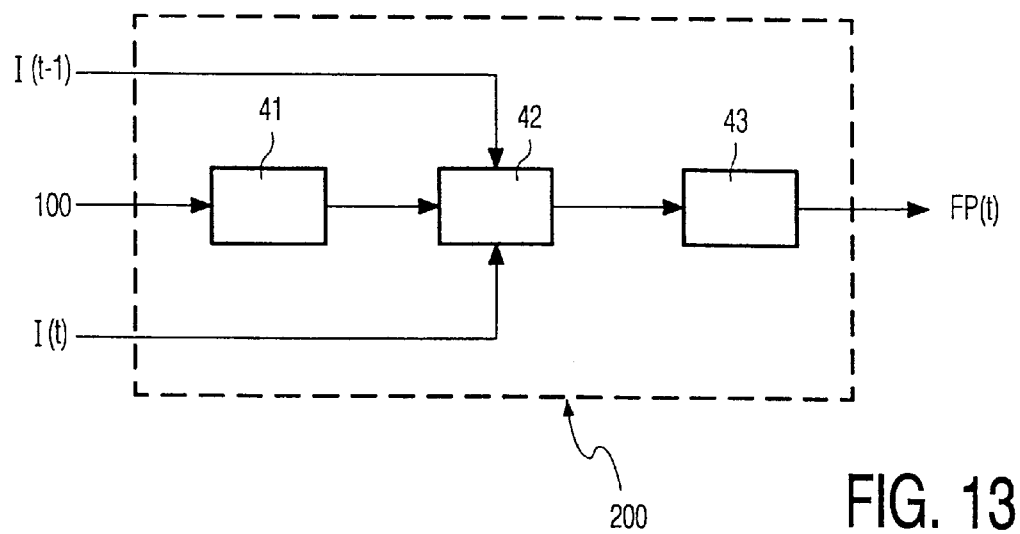
FIG. 13 shows a block diagram of a partition creation device provided for the implementation of the second sub-step of the projection step.
Figure 5:
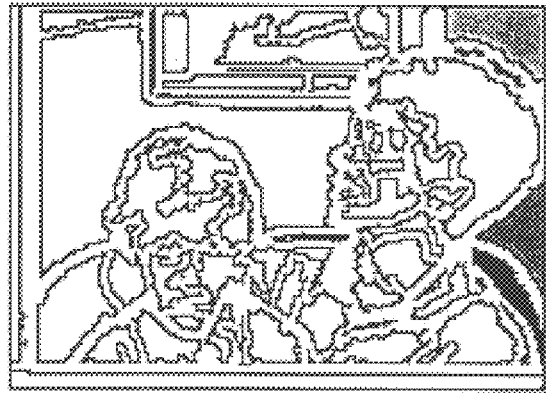
Figure 6:
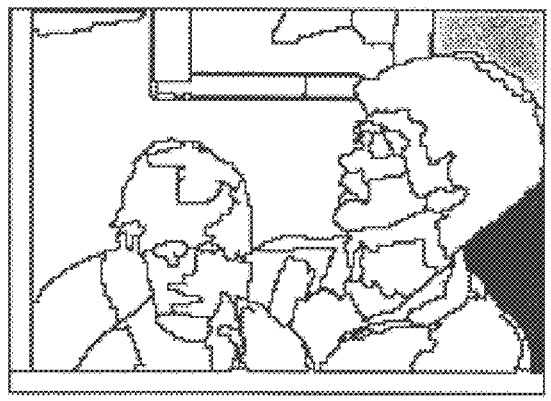

The second sub-step of this projection step is the partition creation, described in reference to FIG. 13 that shows an implementation of said sub-step 212 by means of a partition creation device 200. In order to obtain the final partition P(t), the selected markers are grown in the current image using an extension of the basic watershed algorithm (described for example by F. Meyer and S. Beucher in "Morphological Segmentation", Journal of Visual Communication and Image Representation, 1(1) pp.21–46, September 1990). In previous approaches, the partition creation operation made use of the motion compensated image $\hat{I}(t)$ to drive the watershed algorithm, while the extension now proposed does not use said image $\hat{I}(t)$ but only information from the original images I(t−1) and I(t). The possible errors introduced by the motion estimation and compensation techniques are thus shortcut. This extended watershed algorithm uses as cost function a combination of the texture and contour information of the region. In order to assign a pixel belonging to the uncertainty area to a given region, the mean gray level value of the region is compared with the gray level value of the pixel. The mean gray level value of a given region k is estimated using both the pixel values of the same region k in the previous image and the values of the pixels covered by its associated marker in the current image.

Figure 14:
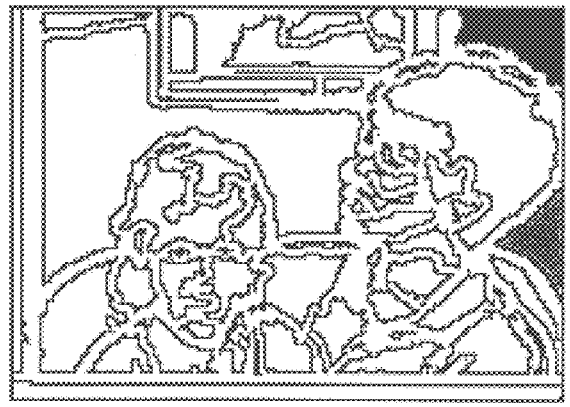
FIGS. 14 to 16 give an example of marker re-labelling between two frames of the sequence already considered in FIGS. 4 to 7.
Figure 15:
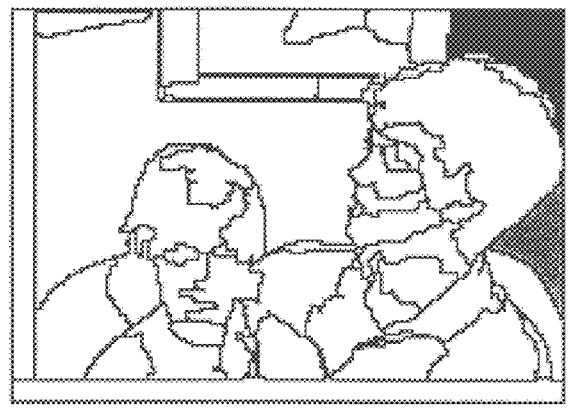
Figure 16:
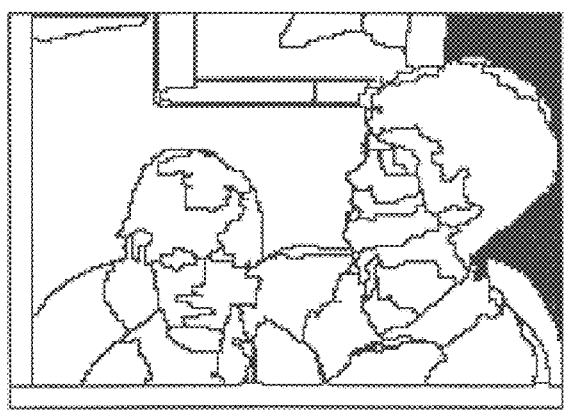

When two markers have been created from a single region (see FIGS. 4 to 7), the gray levels of the pixels covered by these markers are not combined to compute the mean value. This implies a re-labelling of one of the two markers in a marker re-labelling circuit 41. Then, for each marker, a different mean value is calculated using the pixel values of the region in the previous image and the values of the pixels covered by the marker. Therefore, although the label of a marker may change, the process has still memory of the previous region from which this marker comes. This allows the marker to recover its original label if the growing process leads it to grow and touch another marker with the same previous label. An example of re-labelling is presented in FIGS. 14 to 16. In this example, the background behind the head of the woman was segmented as a single region in the previous image. However, due to the movement of the head of the woman, the previous marker yields two unconnected components, large enough to be preserved during the marker projection sub-step 211. Therefore, as illustrated in FIG. 14, both markers are preserved and labelled as different regions. At the end of the growing process (extended watershed algorithm) carried out in a marker growth circuit 42, the two markers from the background get into contact (see FIG. 15). Therefore, as they belong to the same previous region, they are merged together in a merging circuit 43 (see FIG. 16) and the same label is assigned to both of them, which allows a correct tracking of the background (if desired).

In order to further improve the temporal stability in the partition creation sub-step 212, the growing process is controlled by motion information, the control of the shape deformation of markers being driven by the information provided by a change detection algorithm. This technique prevents markers related to static (moving) areas of the image to overgrow, covering moving (static) areas.

From the projected fine partition PFP(t), the final partition P(t) can then be obtained by re-labelling its regions. This is the last operation of the presented double partition approach.

In order to iterate the process, a new fine partition can be obtained starting from the final partition P(t). Nevertheless, the information contained in the projected fine partition PFP(t) can be used to start the process of creation of the fine partition. The new fine partition is, therefore, obtained by re-segmenting the projected fine partition. The need for this re-segmentation is twofold. First, the projection step may have yielded regions which do not present a complete spatial homogeneity. Such regions have to be re-segmented in order to ensure the success of the following projection step. Secondly, new objects may have appeared in the scene. Since the projection step only deals with the accommodation of the regions from the previous partitions in the current image, new objects are not represented in the projected partition. The re-segmentation may create new regions inside the selected object. In this case, the new region is assumed to belong to the selected object and, therefore, it will be tracked with the other parts of the object.

Figure 17:
FIGS. 17 to 19 illustrate the introduction of a new region in the projected fine partition of frame (n+5) of the sequence of FIGS. 8 to 12.
Figure 18:
Figure 19:
Figure 20A:
FIGS. 20 to 23 illustrate different possible applications of the method according to the invention.
Figure 20B:
Figure 20C:
Figure 20D:
Figure 20E:
Figure 20F:

An example of the situation described in the previous paragraph is presented in FIGS. 17 to 19. In the first image (FIG. 17), the fine partition of a frame of the "foreman" sequence is shown, where the man has been selected. The second image (FIG. 18) presents the fine projected partition of frame (n+5) after re-segmentation. In the re-segmentation process, a new region has appeared (marked in black in the image). Since this new region is contained inside the selected object, it is added to the set of regions belonging to it. This final result is presented in the third image (FIG. 19).

The above-described method for object tracking can lead to various applications, given its capability to deal with different object definition criteria. In the following description, this technique is applied to various sequences presenting different scenarios. Each example (tracking of a complete moving object, tracking of a part of an object, creation of a hierarchy of objects) tries to illustrate a distinct possible application.

In the first application, a single object with homogeneous motion is tracked. This is the usual application tackled by classical approaches. However, some of these approaches rely on motion detection. In other words, they assume that there is only one moving object in the scene. Therefore, they may fail in the presence of either multiple moving objects or global movement of the camera. To show the robustness of the present method, the tracking of the person in the sequence "foreman" has been done using non-consecutive frames: FIGS. 20a to 20f illustrate the tracking of the man in the frames having in the sequence the numbers 5, 20, 85, 130, 155 and 185 respectively. Due to the combination of spatial and motion criteria, objects may be tracked even in the case of global movement of the camera. In the case of a new object appearing in the scene (for example the hand of the man) and partially occluding the selected object, the tracking of the body is not perfect. In addition, since the spatial information of the hand is quite similar to the texture of the face, regions from the selected object are motion compensated in the zone of the hand. This leads to the inclusion of the hand in the selected object. Nevertheless, such a situation does not prevent to keep tracking the body of the person even when the camera is panning.

Figure 21A:
Figure 21B:
Figure 21C:

In the second application, a part of an object is separately tracked, in spite of having the complete object homogeneous motion. Therefore, the correct boundaries of the selected object are to be defined based on spatial homogeneity. Classical techniques usually fail when addressing this problem since they mainly rely on motion information. FIGS. 21a to 21c show the results of tracking only the head of the person in the sequence "foreman", for example for the frames having the numbers 5, 20 and 85 respectively (in the previous case and in the present one, only one out of five frames has been used in the tracking process). The object is correctly tracked, although it does not present spatial homogeneity and forms part of a larger object with homogeneous motion.

Figure 22A:
Figure 22B:
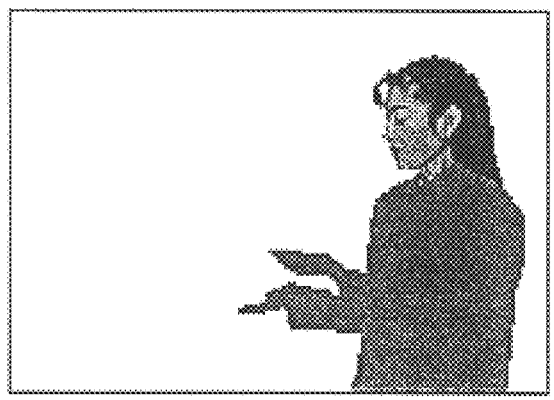
Figure 22C:
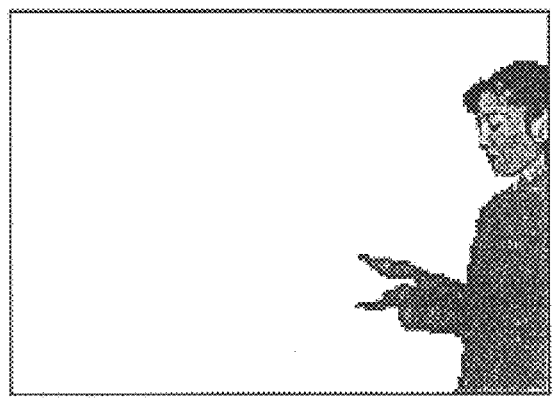
Figure 23A:
Figure 23B:
Figure 23C:
Figure 23D:
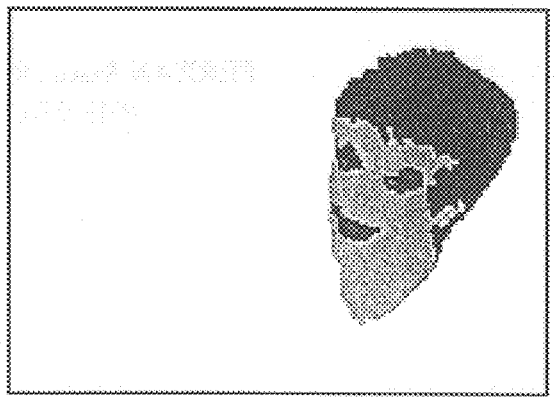
Figure 23E:
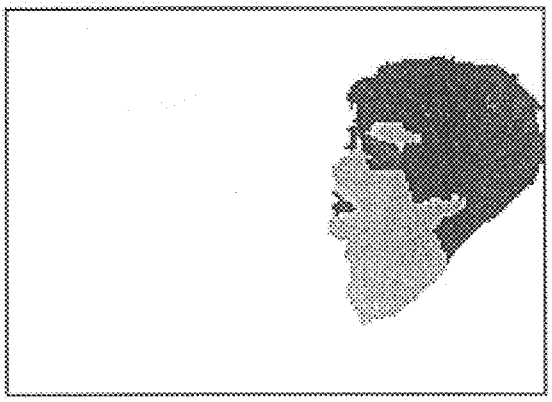
Figure 23F:
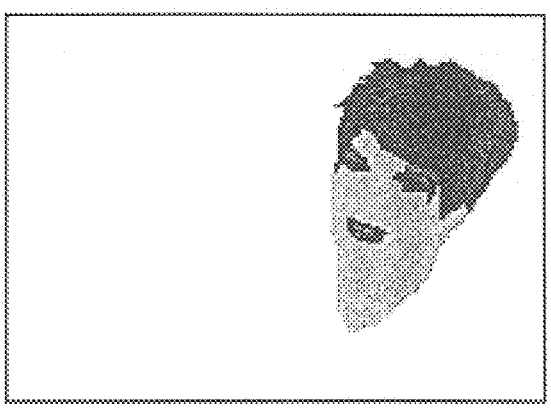

In the third application, the sequence is assumed to be already divided into video objects (VOs). The proposed technique allows to track an object which is contained in one of the VOs. This way, a hierarchy of objects can be created, allowing the division of VOs. This hierarchy of objects can be used to perform content-based scalable coding where, in the different levels of scalability, the quality of specific objects is improved. Since the proposed object tracking technique makes use of a watershed algorithm to obtain the final partition, the shape of the VOs can be introduced as a constraint in the growing process. This ensures that the different objects within the VOs will not overgrow outside their associate VO. In FIGS. 22a to 22c, the tracking of the head of the woman in another sequence ("weather") is presented, for instance in the VO of the frames having the numbers 125, 225 and 250 respectively. Although the complete body presents similar motion, the head may be separately tracked. It must be noted that the shape of the head is always contained in the original VO, thus creating the above-mentioned hierarchy.

In a fourth application, the previous idea may be extended to the general case of tracking a selected object while producing a hierarchy of objects within it. In this case, the fine partition in the projection step cannot be binary since it has to keep track of the different objects in the hierarchy. In FIG. 23, the tracking of the head of the woman in the sequence "mother and daughter" is presented for instance for the frames having the numbers 0, 49 and 218 respectively. Within the head of the woman, four different objects may be selected (in FIGS. 23a to 23c) and tracked: the mouth, the eyes and the hair. The gray level values of the pixels inside the regions associated to these objects will then be shown (in FIGS. 23d to 23f), while the rest of the head will be presented in grey.

What is claimed is:

1. An object tracking method applied to an image sequence, said method comprising in series the following steps:

(A) a segmentation step for defining the regions of a first coarse partition P(t−1) of an image I(t−1), said regions corresponding to the objects to be tracked, and, from said coarse partition P(t−1) and on the basis of a spatial homogeneity criterion, a finer partition FP(t−1);

(B) a projection step for defining a projection PFP(t) of said fine partition FP(t−1) into the current image I(t);

(C) a re-labelling step of said projected fine partition PFP(t), for defining the final partition P(t); wherein said projection step comprises in series the following sub-steps:

(1) a marker projection sub-step, provided for yielding on the basis of motion and spatial information a set of markers for the current image, said marker projection sub-step itself comprising in series the following operations:

(a) based on a motion estimation operation between the images I(t−1) and I(t), a backwards motion compensation operation of the fine partition FP(t−1), yielding a compensated fine partition CFP(t−1) made of so-called compensated markers;

(b) in said compensated fine partition, a component selection operation, provided for selecting, among the possible unconnected components that correspond to a single label of the coarse partition P(t−1) and have the same label, only the components that, for each of these specific labels, satisfy a predetermined spatial criterion;

(2) a partition creation sub-step, by means of a growing process of said set of compensated markers in order to obtain said final partition.

2. A method according to claim 1, wherein said partition creation sub-step itself comprises in series the following operations:

(c) a marker re-labelling operation, provided for re-labelling, when several markers have been created from a single region of the fine partition FP(t−1), all the markers except one;

(d) a growth operation of all selected markers in the current image I(t) by means of a tridimensional extended watershed algorithm, leading to the projected fine partition PFP(t);

(e) a merging operation of the regions of said projected fine partition PFP(t) that, having the same label in the previous image, are connected after the region growing, for defining the final partition P(t).

3. A method according to claim 2, wherein said marker projection sub-step also comprises in series:

(c) a cleaning operation based on the gradient of the compensated markers;

(d) a boundary removal operation; these two operations being applied in order to ensure the gray level homogeneity of the projected markers while preserving their homotopy.

4. A method according to claim 1, wherein said motion estimation operation is a backwards block-matching process, provided for ensuring that, after the compensation operation, every pixel in the current image I(t) has assigned one and only one pixel from the coarse partition P(t−1).

5. A method according to claim 1, wherein, during said component selection operation, an unconnected component with a given label k is selected if it contains at least a given percentage of all pixels with the same label k in the compensated fine partition CFP(t−1).

6. A method according to claim 5, wherein said percentage is about 40%.

7. A method according to claim 1, wherein, for each of said compensated markers, the mean value of the gradient of the pixels that said marker covers is computed, all pixels that are above a given threshold over said mean value being also assigned to a so-called uncertainty area surrounding the compensated markers and already including the non-selected components.

8. A method according to claim 7, wherein, for each marker re-labelling operation, a second mean value is calculated using the pixel values of the region in the previous image I(t−1) and the values of the pixels covered by said marker.

9. A system for an object tracking applied to partitions, resulting from a segmentation of images, of an image sequence, each partition P(t−1) determining in corresponding image I(t−1) regions that define the objects to be tracked and leading after a refined segmentation to a finer partition FP(t−1), said system comprising the serial arrangement of a projection stage, for defining a projection PFP(t) of said fine partition FP(t−1) into the current image I(t), and a re-labelling stage, for defining from said projection fine partition PFP(t) the current partition P(t), wherein said projection stage comprises:

(a) a motion estimation circuit, for carrying out a motion estimation between the images I(t−1) and I(t);

(b) a motion compensation circuit, for defining, on the basis of said motion estimation applied to said fine partition FP(t−1), a compensated fine partition CFP(t−1) made of so-called compensated markers;

(c) a component selection circuit, for selecting, among possible unconnected components that correspond to a single label of the partition P(t−1) and have the same label, only the components that, for each of the specific labels satisfying a predetermined spatial criterion;

(d) a partition creation device, for finally defining said current partition P(t) by means of a growing process of the compensated markers.

10. A system according to claim 9, further comprising in series between the component selection circuit and the partition creation device, a cleaning circuit, provided to ensure the grey level homogeneity of the projected markers while preserving homotopy.

* * * * *

UNITED STATES PATENT AND TRADEMARK OFFICE
CERTIFICATE OF CORRECTION

PATENT NO.    : 6,130,964
DATED         : October 10, 2000
INVENTOR(S)   : Ferran Marques and Cristina Molina It is certified that error appears in the above-identified patent and that said Letters Patent is hereby corrected as shown below:

<u>Title page,</u>
Item [57], ABSTRACT,
Line 1, delete "This";
Line 1, before "relates" insert -- the present invention --;
Line 1, change "a" to -- an improved --.

Signed and Sealed this

Twelfth Day of November, 2002

*Attest:*

*Attesting Officer*

JAMES E. ROGAN
*Director of the United States Patent and Trademark Office*